(12) United States Patent
Walker et al.

(10) Patent No.: US 7,135,133 B2
(45) Date of Patent: Nov. 14, 2006

(54) METHOD AND APPARATUS FOR MANUFACTURING PLASTIC OPTICAL TRANSMISSION MEDIUM

(75) Inventors: James K. Walker, Gainesville, FL (US); Jacob Ralph Tymianski, Gainesville, FL (US); Bongsoo Lee, Kyung-Do (KR); Stephan A. Tuchman, Gainesville, FL (US); Won Young Choi, Gainesville, FL (US)

(73) Assignee: Nanoptics, Inc., Gainesville, FL (US)

( * ) Notice: Subject to any disclaimer, the term of this patent is extended or adjusted under 35 U.S.C. 154(b) by 373 days.

(21) Appl. No.: 09/833,833

(22) Filed: Apr. 12, 2001

(65) Prior Publication Data

US 2002/0041042 A1    Apr. 11, 2002

Related U.S. Application Data

(60) Provisional application No. 60/196,687, filed on Apr. 12, 2000.

(51) Int. Cl.
B29D 11/00 (2006.01)

(52) U.S. Cl. ............ 264/1.24; 264/1.27; 264/1.29

(58) Field of Classification Search ............ 264/1.24, 264/1.29, 1.1, 1.27
See application file for complete search history.

(56) References Cited

U.S. PATENT DOCUMENTS

| | | | |
|---|---|---|---|
| 5,235,660 A | | 8/1993 | Perry et al. |
| 5,593,621 A | | 1/1997 | Koike et al. |
| 5,935,491 A | | 8/1999 | Tripathy et al. |
| 5,938,986 A | * | 8/1999 | Nakamura ............ 264/1.24 |
| 6,254,808 B1 | * | 7/2001 | Blyler et al. ............ 264/1.29 |
| 6,265,018 B1 | * | 7/2001 | Blyler et al. ............ 427/8 |

FOREIGN PATENT DOCUMENTS

| | | |
|---|---|---|
| EP | 0130838 | 7/1987 |
| EP | 1080871 | 8/2000 |
| JP | 1265208 | 10/1989 |
| WO | 8701071 | 2/1987 |

OTHER PUBLICATIONS

Ho, B.C., et al. (1995) "Gradient-Index Polymer Fibers Prepared by Extrusion," Polymer Journal, vol. 27, No. 3, pp. 310-313.
Shi, R.F., et al. (1997) "Origin of high bandwidth performance of graded-index plastic optical fibers" Appl. Phys. Lett., 1997, 71 (25), 2635-2637.
Ishigure, T., et al. (1998) "Graded Index Polymer Optical Fiber with High Thermal Stability of Band-width," Jpn. J. of Appl.Phys., vol. 37, pp. 3986-3991.
Tsai, et al. (1997) "Numerical Simulation of an Optical Fiber-Forming Process," Chemical Engineering Science, vol. 52, No. 2, pp. 221-235.

(Continued)

Primary Examiner—Mathieu D. Vargot
(74) Attorney, Agent, or Firm—Saliwanchik, Lloyd & Saliwanchik

(57) ABSTRACT

The present invention relates to a method and apparatus for manufacturing plastic optical transmission medium. The subject method and apparatus can produce a variety of optical transmission medium, including for example, graded refractive index polymer optical fiber, graded refractive index rod lens, and step index polymer optical fiber. The subject optical transmission medium have improved characteristics and efficiency, due, at least in part, to better control of the profile of the refractive index distribution and stable high temperature operation of the medium. High efficiency of manufacturing can be achieved by the subject method and apparatus which can permit continuous extrusion at high speed.

30 Claims, 9 Drawing Sheets

OTHER PUBLICATIONS

Blyler, Jr., L.L. et al. (1997) "Dopant Diffusion and Long Term Reliability Characteristics of Graded-Index Polymer Optical Fibers" Proceedings of POF Conference, Kauai, Hawaii, Sep. 1997, pp. 42-43.

Koike, Y. (1998) "Progress in GI-POF—Status of High Speed Plastic Optical Fiber and its Future Prospect" Seventh International Plastic Optical Fibers Conference, Berlin, Germany, Oct. 5-8, 1998, pp. 1-5.

* cited by examiner a) GRIN RADIAL PROFILE b) GRIN RADIAL PROFILE

METHOD AND APPARATUS FOR MANUFACTURING PLASTIC OPTICAL TRANSMISSION MEDIUM

CROSS-REFERENCE TO A RELATED APPLICATION

This application claims priority from provisional application U.S. Ser. No. 60/196,687, filed Apr. 12, 2000.

BACKGROUND OF THE INVENTION

Graded index plastic optical fiber (GI-POF) offers promise as a high bandwidth communication medium. The ability to create a desired index of refraction profile in a plastic optical fiber Methods of manufacture of this material have been proposed in U.S. Pat. Nos. 5,593,621, and 5,523,660, EP 130838, EP 2682969, JP1-265208, JP3-65904, JP3-64704, and WO87/01071, and Polymer Journal, Vol. 27, No. 3, pp 310–313 (1995). These manufacturing methods, however, suffer from various drawbacks. For example, some methods require the initial production of a graded index preform and subsequent drawing of fiber from the preform, resulting in a low efficiency of production. Other methods rely on a non-uniform radial distribution of a low molecular weight additive in the fiber and, due to the high concentrations by weight of additives which lower the glass transition temperatures of the fiber, can result in fiber which does not meet the thermal stability requirements for certain applications.

BRIEF SUMMARY OF THE INVENTION

The subject invention pertains to a method and apparatus for manufacturing a plastic optical transmission medium. A specific embodiment of the subject method can allow continuous high-speed production while controlling the refractive index profile of the optical transmission medium, and can produce optical transmission medium with high optical transmission and good thermal stability.

The subject invention provides a method of manufacturing a plastic optical transmission medium in which a solid polymeric tube having at least two concentric cylinders of polymeric material is surrounded by an outer tubing, wherein at least one of the two concentric cylinders has a diffusible additive which modifies the index of refraction added with the polymeric material of the cylinder. The surrounded polymeric tube can then be heated to cause diffusion of the diffusible additive. The temperature to which the surrounded polymeric tube is heated should be below the outer tubing's melting temperature, and preferably below the outer tubing's glass transition temperature so that the structural integrity of the outer tubing is maintained. The temperature should also be above the glass transition temperature of the polymeric materials of the polymeric tube. In this way, the outer tubing can maintain its structural integrity and hold the polymeric tube materials in place while diffusion of the diffusible additives takes place. By controlling the temperature and time period of the heating, the amount of diffusion can be controlled.

In a specific embodiment, two or more concentric cylinders of transparent polymer melt are extruded to form a single extruded polymeric tube. At least one of the polymer melts can contain one or more transparent low molecular weight diffusible additives. The additives diffuse within the melt and/or into adjacent melts at a rate dependent on a variety of parameters including the temperature of the polymeric tube, the time during which diffusion is permitted to occur and the diffusion constants of the additive(s). In a specific embodiment, the extruded polymeric tube can incorporate an outer tubing made of TEFLON®. Other materials can also be used for an outer tubing. In a specific embodiment, the outer tubing can be allowed to solidify before or slightly after encasing the extruded polymeric tube which will become a plastic optical transmission medium such as a graded-index (GRIN) fiber. The outer tubing's internal diameter is preferably in the range 0.15 mm to about 1.0 mm, depending on the desired diameter of the GRIN fiber.

The final radial distribution of the additives within the polymeric tube, together with the refractive indices of the individual polymers, determine the final graded index profile of the fiber. The characteristic distance, over which diffusion of additives occur, is preferably significantly less than the outer tubing radius, for example in the range of about 0.1 mm. In a specific embodiment, the time necessary to achieve the desired degree of additive diffusion can be on the order of 100 seconds or more. Preferably, the diffusible additives are chosen to have refractive indices substantially different from that of their polymer melts in order to keep the percentage amount of necessary additive low. As the addition of diffusible additives typically reduces the glass transition temperature, keeping the percentage amount of additive low minimizes the reduction of the glass transition temperature of the polymer. Maintaining a high glass transition temperature of the resulting GRIN fiber can confer good stability at high operating temperatures.

In a specific embodiment of the subject invention for producing GRIN fiber, an index-enhancing additive is used near the axis and, in addition, an index-reducing additive is used at the outer radius of the fiber. By incorporating additives throughout the resulting GRIN fiber in this way, the glass transition temperature of the GRIN fiber material does not change substantially as a function of radius. In a specific embodiment, index-reducing additives composed of highly fluorinated compounds which are nevertheless soluble in acrylic-based polymers can be used. The use of these highly fluorinated compounds as index-reducing additives can provide a large difference in refractive index from the axis to the outer radius of the fiber and can reduce the amount of additive needed to achieve the desired index profile. Reducing the amount of additives can raise the glass transition temperature of the fiber and permit the fiber to achieve stable operation at high temperatures.

Once the outer tubing, for example a TEFLON® tube, is in place, the GRIN fiber can be heated to a temperature below the glass transition temperature and/or melting point of the outer tubing and above the glass transition temperature of the GRIN fiber such that diffusion of the additives can occur. Preferably, the GRIN fiber is heated substantially above the glass transition temperature of the GRIN fiber such that diffusion of the additives can occur rapidly. In a specific embodiment, the GRIN fiber can be wound continuously on a heated drum for a number of turns which can provide an adequate time duration at a given fiber production rate to achieve the desired GRIN profile. Alternative methods of heating the fiber are well known in the art and can be used.

As a further means of achieving long-term thermal and mechanical stability, cross-linking of the fiber material may be achieved by photo-initiation. In a specific embodiment, cross-linking of the fiber can be accomplished during the residence time of the fiber on the drum.

In a specific embodiment of the subject invention, three or more concentric polymer melts and two or more diffusible additives whose refractive indices are carefully chosen with respect to the melts in which they are diffused, can be utilized to produce a graded index fiber which exhibits long-term stable operation in the temperature range −40° C. to +85° C.

Furthermore, the subject invention can allow fiber to be produced at a high rate of production and with a controlled index profile, leading to high bandwidth capability, high transparency, and high thermal stability at high ambient temperatures. In addition, GRIN fiber having a variety of numerical apertures and graded index profiles can be continuously produced.

BRIEF DESCRIPTION OF THE DRAWINGS

FIG. 2b shows a schematic illustration of a cross-section of a die which can be utilized in conjunction with the embodiment of the subject invention shown in FIG. 2a.

FIG. 3b shows a schematic illustration of a cross-section of a die which can be utilized in conjunction with the embodiment of the subject invention shown in FIG. 3a.

DETAILED DISCLOSURE OF THE INVENTION

Figure 1:
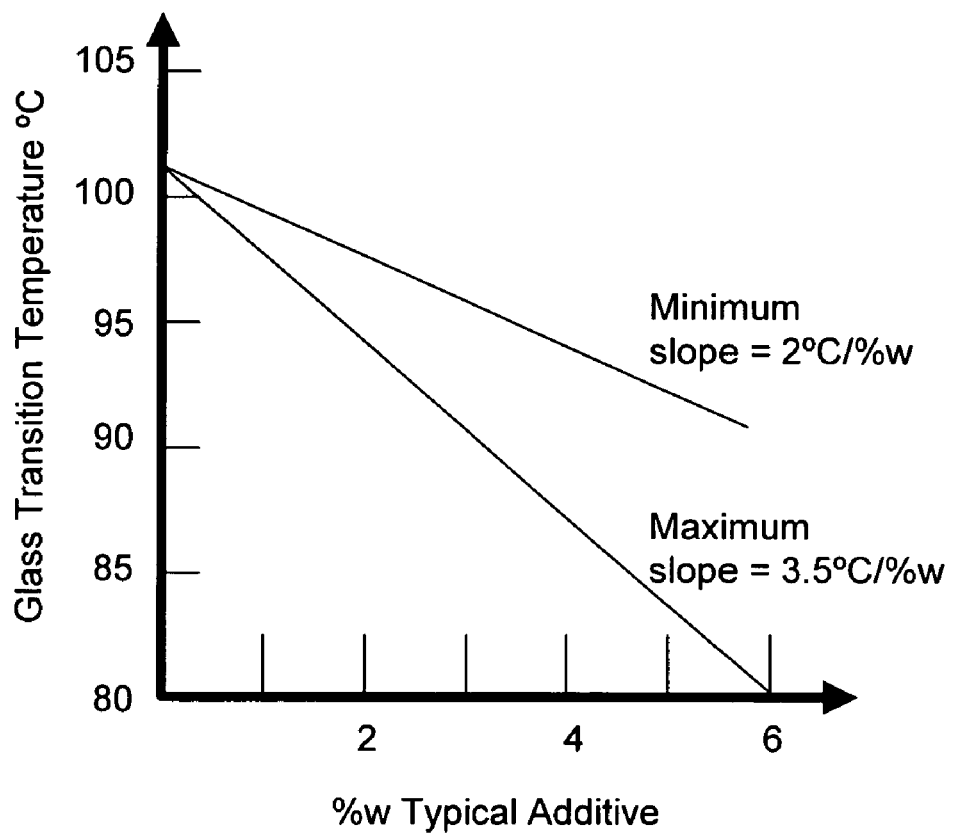
FIG. 1 Illustrates the glass transition temperature of PMMA blend versus concentration by weight of a typical additive shown in Table 2.

The subject invention pertains to a method and apparatus for manufacturing a plastic optical transmission medium. The subject method can allow continuous high-speed production while controlling the refractive index profile of the optical transmission medium, and can produce optical transmission medium with high optical transmission and good thermal stability.

In a specific embodiment of the subject invention, two or more concentric cylinders of transparent polymer melts in which are dissolved one or more transparent low molecular weight diffusible additive(s) can be utilized to produce a plastic optical transmission medium. Cylinders of melt can be extruded into a solidified polymeric tube via, for example, a cross-head type of die. The tube containing the melt materials can be maintained at high temperature for a specific time period, such that the additives diffuse within the polymeric tube and, in particular, from the polymer melt in which they were dissolved into the adjacent melts, to produce a desired index profile. The additives and polymers can be selected to meet the desired optical, thermal, and mechanical properties of the resulting optical transmission medium.

In a specific embodiment, some of the specific desired properties of a graded-index plastic optical fiber (GI-POF) include:

1. Optical Attenuation $\leq$150 dB/km
2. Parabolic Index Profile with Bandwidth $\geq$2.5 GHz/100 m
3. Numerical Aperture 0.1 to 0.25
4. Long-Term Thermal Stability Temperature Range −40° C. to +85° C. (Blyler Jr., L. L., et al., 1997, and Ishigure, T., et. al., 1998)
5. Production rate of GRIN fiber $\geq$2000 m/hour The present invention can utilize organic polymers and/or perfluorinated polymers to achieve GI-POF with the desired properties.

A choice of organic polymers suitable for the high optical transmission desired in a specific embodiment of the subject invention is the methacrylate family. Other amorphous organic polymers may be used, when, for example, the highest optical transmission is not required. Such polymers include, for example, polystyrene, polycarbonate, and copolymers thereof. Specific examples of polymers which may be used in the subject invention are given in Table 1.

TABLE 1

Typical Organic Polymers Suitable for the Subject Invention

| Polymer | Refractive Index | Glass Transition Temperature ° C. |
|---|---|---|
| Polymethyl methacrylate (PMMA) | 1.492 | 101 |
| Polycyclohexyl methacrylate | 1.5066 | 104 |
| Polyphenyl methacrylate (PPMA) | 1.5706 | 110 |
| Polytrifluoroethyl methacrylate (PTMA) | 1.415 | 82 |
| Poly (2,2,3,3-Tetrafluoropropyl-α-fluoroacrylate) (PTFA) | 1.391 | 138 |
| Poly (2,2,3-Trifluoropropyl-α-fluoroacrylate) | 1.397 | 95 |
| Poly (2,2,3,3,3-Pentafluoropropyl-α-fluoroacrylate) | 1.386 | 125 |
| Poly (2,2,3,3,4,4,5,5-Octafluoropentyl-α-Fluoroacrylate) | 1.366 | 105 |

Copolymers of the materials given in Table 1 are also suitable. Table 1 shows the refractive indices of the homopolymers and their glass transition temperatures. In addition, perfluorinated amorphous polymers such as TEFLON® AF (DuPont) and CYTOP™ (Asahi) may be used and are given in Table 2.

TABLE 2

Typical Perfluorinated Polymers Suitable for the Subject Invention

| Polymer | Refractive Index | Glass Transition Temperature ° C. |
|---|---|---|
| TEFLON ® AF amorphous copolymers of 2,2-bis (trifluoromethyl)-4,5-difluoro-1,3-dioxole and tetrafluoroethylene | 1.29–1.31 | 160–240 |
| CYTOP ™ an amorphous polymer produced by Asahi Glass Co | 1.34 | 108 |

In a specific embodiment, diffusible additives are selected to satisfy one or more, and preferably all, of the following criteria:

1. The additives are soluble in the required concentrations in the homopolymers and copolymers utilized.
2. The boiling point is as high as possible and preferably at least as high as the melt extrusion temperature to prevent the formation of bubbles.
3. The diffusion constant is such as to provide adequate diffusion during manufacture (for example at ~130°–190° C.) and high stability during use (for example up to 85° C.).
4. The refractive index is as different as possible (for example at least about ±0.05 and preferably ≧±0.1) from that of the polymers to reduce the amount in weight % to achieve the desired refractive index of the polymer melt solution.

Examples of transparent additives which can be used with organic polymers are given in Table 3. Examples of additives which can be used with perfluorinated polymers are given in Table 4.

The subject invention relates to the use of very low refractive index compounds as index modifying additives. Methyl esters of perfluoro (polyoxa) monocarboxylic acids represent one class of compounds that can be utilized as index modifying additives of the subject invention. Table 3 lists one example from this class of compounds, perfluoro-2,5,8-trimethyl-3,6,9 trioxadodecanoic acid, methyl ester (PTTME) (F[CF(CF$_3$)CF$_2$O]$_3$CF(CF$_3$)COOCH$_3$). Other examples from this class include perfluoro-2,5-dimethyl-3,6-dioxanonanoic acid, methyl ester (F[CF(CF$_3$)CF$_2$O]$_2$CF(CF$_3$)COOCH$_3$; molecular weight 510, b.p. 156°) and perfluoro-2,5,8,11-tetramethyl-3,6,9,12-tetraoxapentadecanoic acid, methyl ester (F[CF(CF$_3$)CF$_2$O]$_4$CF(CF$_3$)COOCH$_3$; molecular weight 842, b.p. >250°). Therefore, it should be readily apparent that compounds of the general formula, F[CF(CF$_3$)CF$_2$O]$_x$CF(CF$_3$)COOCH$_3$, wherein X≧2, can be utilized as index modifying additives of the subject invention.

In addition, methyl esters of perfluoro aliphatic monocarboxylic acids represent another class of compounds that can be utilized as index modifying additives of the subject invention. Table 3 lists one example from this class of compounds, methyl perfluorooctanoate (C$_8$H$_3$F$_{15}$O$_2$). Other examples from this class include methyl perfluorononanoate (C$_{10}$H$_3$F$_{17}$O$_2$; molecular weight 478), methyl perfluorodeeanoate (C$_{11}$H$_3$F$_{19}$O$_2$; molecular weight 528), methyl perfluorododeeanoate (C$_{13}$H$_3$F$_{19}$O$_2$; molecular weight 628), and methyl perfluorotetradecanoate (C$_{15}$H$_3$F$_{27}$O$_2$; molecular weight 728). Therefore, it should be readily apparent that compounds of the general formula, C$_x$H$_3$F$_y$O$_2$, wherein x≧9 and y≧15, can be utilized as index modifying additives of the subject invention.

The preceding compounds can include methacrylate or acrylate functionalities, which provide adequate affinity with the polymeric matrices, as well as a perfluorinated unit, which confers a very low refractive index to the additive. In addition to perfluorinated compounds, as described in the preceding paragraphs, partially fluorinated compounds are also contemplated as index modifying additives of the subject invention.

The current practice of manufacturing GI-POF relies on the immobilization of a low molecular weight additive in a fixed concentration profile within the matrix polymer below its glass transition temperature. Applications which subject the GI-POF to a maximum operation temperature of 85° C. can be very demanding since it requires the glass transition temperature of the polymer be >85° C. at all radii of the GI-POF. The glass transition temperature (Tg) of a polymethylmethacrylate blend containing an increasing concentration of a typical additive is shown in FIG. 1. The Tg was defined as the midpoint of the specific heat change associated with the transition.

The two slopes, corresponding to 2° C./% wt. of additive and 3.5° C./% wt. of additive, bracket the data of a substantial number of additives (Ishigure, T., et. al., 1998 and Blyler, et. al., 1997). For the purpose of describing the subject invention, the maximum slope curve corresponding to 3.5° C./% wt. has been taken as applying to any additive. In practice, the fiber designed according to the subject invention analyzed in accordance with this assumption will therefore be underestimated in its thermal stability. In alternative embodiments, larger concentrations by weight (3%–15% by weight) of additives may be used to achieve higher numerical aperture fiber at the expense of some reduction in the thermal stability.

TABLE 3

Typical Additives for Organic Polymers Suitable for the Subject Invention

| | Transparent Soluble Additive in the Methacrylate Polymers | Molecular Weight | Refractive Index | Boiling Point |
|---|---|---|---|---|
| Large Refractive Index | Dibenzyl ether | 198 | 1.562 | 298 |
| | Triphenyl phosphate | 326 | 1.63 | mp 51° |
| | 1,2,4,5-Tetrabromobenzene | 394 | 1.61 | mp 180° |
| | Diphenyl phthalate | 318 | 1.572 | mp 75° |
| | Benzyl benzoate | 212 | 1.568 | 323 |
| | Benzophenone | 182 | 1.606 | 306 |
| | Biphenyl | 154 | 1.588 | 256 |
| | 3-Phenyltolume | 168 | 1.60 | 272 |
| | 2-Phenylpyridine | 155 | 1.62 | 270 |
| | Diphenyl sulphide | 186 | 1.63 | 296 |
| | Diphenyl sulfone | 218 | 1.63 | 379 |
| | Diphenyl sulfoxide | 202 | 1.63 | 207 |
| Low Refractive Index | Triethyl phosphate | 182 | 1.450 | 215 |
| | Tributyl phosphate | 266 | 1.424 | 290 |
| | Glycerol triacetate | 218 | 1.429 | 260 |
| | Perfluoro 2,5,8-trimethyl-3,6,9-trioxadodecanoic acid, methyl ester (PTTME) | 676 | 1.295 | 195 |
| | Methyl perfluorooctanate | 428 | 1.305 | 160 |

TABLE 4

Typical Additives for Perfluorinated Polymers Suitable for the Subject Invention

| | Transparent Soluble Additive in the Perfluorinated Polymers | Molecular Weight | Refractive Index | Boiling Point |
|---|---|---|---|---|
| Large Refractive Index | N-Pentafluorophenyldichlomaleimide | 332 | >1.39 | 148–151° mp |
| | Octafluoronapthalene | 272 | 1.367 | >200° |
| | Pentafluorophenyl sulfide | 366 | >1.39 | 87° mp |
| Low Refractive index | Perfluoropolyether | >800 | <1.30 | >200° C./ 0.05 mm Mg |
| | Perfluorotrihexylamine | 971 | <1.30 | 250–260° |
| | Perfluoropentadecane | 788 | <1.30 | 228° |

It is apparent from FIG. 1 that the additive concentration should preferably be no more than a few percent at all radii of the GI-POF. The design process for material composition described later will lead to selections of additive concentrations. Similar comments can be made concerning the perfluorinated compounds, although the glass transition temperatures of the polymers are larger which tend to alleviate the problem.

In a specific embodiment of the subject invention, a manufacturing method permits the production of GI-POF having high thermal stability while also achieving adequate numerical aperture.

The preferred method of polymerizing any of the monomers in Table 1 is by thermal polymerization using an initiator and chain transfer agent as is well known in the art. The polymer melts may be prepared or blended with the chosen additives used to produce a desired polymeric tube of two or more concentric cylinders of polymeric material.

Figure 2A:
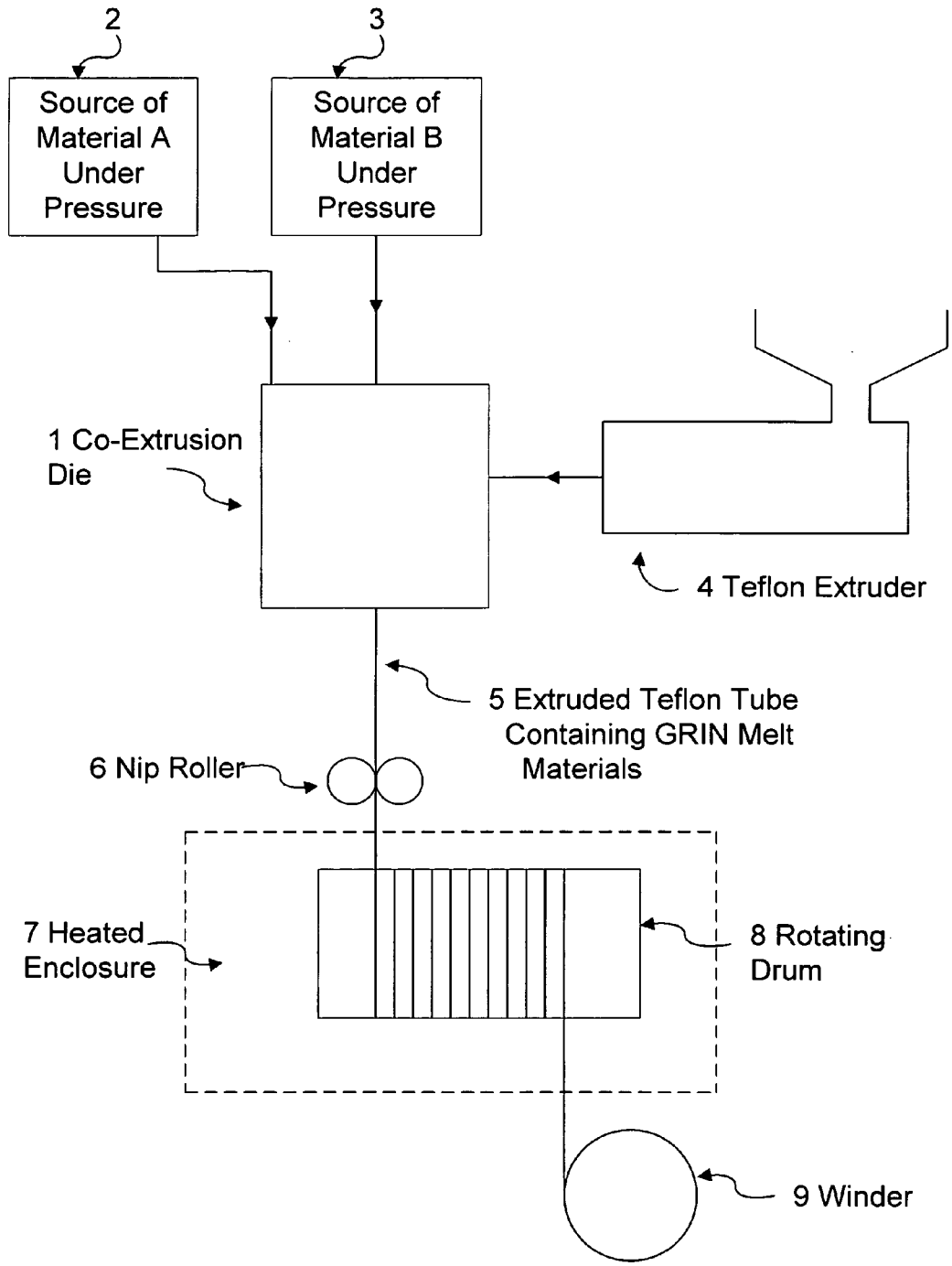
FIG. 2a shows a schematic illustration of an apparatus for manufacturing optical fiber using two melts in accordance with the subject invention.

In a specific embodiment, after preparation and blending with the chosen additives, the polymer melts can be transported to an extrusion die, as shown schematically in FIG. 2a. The pressure may be generated by a nitrogen gas pressure source, pump, extruder, piston, or other means known in the art. Two transparent melt polymers, one or both having a transparent and diffusible additive, can enter the die 1 shown schematically in FIG. 2b. Material B forms a concentric shell around material A. The materials A and B are fed at relative rates into die 1 to achieve the desired index profile. Material A can be the same as Material B or it can be different. Although some diffusion can occur as the materials A and B, with any additives they may have, flow through the die 1, such diffusion is not relied on to finalize the index profile. Instead, the die 1 can be designed to minimize the time materials A and B spend in the melt condition at a temperature suitable for extrusion, in order to minimize the optical degradation which can occur when materials A and B are in the melt condition. Such optical degradation can occur due to such high temperatures and due to contact with metal surfaces at such high temperatures. Such optical degradation can occur over periods of time, for example as small as 10–30 seconds, which is often much less than the period of time needed for adequate diffusion, for example as large as 100–1000 seconds. For periods of time over 60 seconds in the melt state suitable for extrusion optical degradation is very likely to occur. In order to provide adequate time for diffusion, the subject invention involves applying an outer tubing and heating the GI-POF to a temperature above its glass transition temperature but much below the extrusion temperature. During this time the outer tubing maintains the structural integrity of the GI-POF. In this way, diffusion of the index-modifying additives can be accomplished without subjecting the polymeric tube materials to the melt state suitable for extrusion for more than about 60 seconds, preferably not more than about 30 seconds, and more preferably not more than about 10 seconds.

Figure 2B:
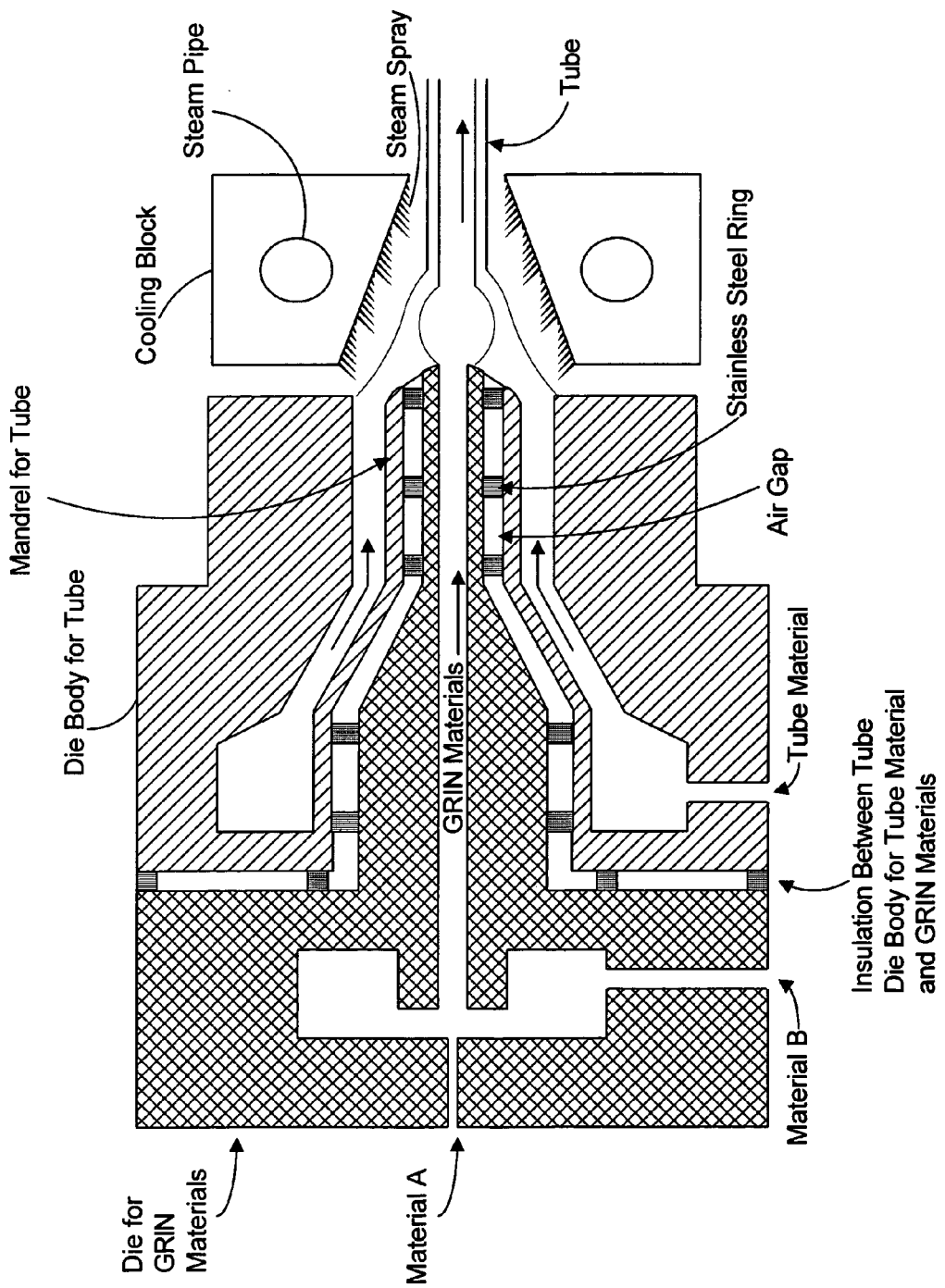

If it is desired to incorporate an outer tubing around the polymeric tube at the exit of the die 1, an optional extruder 4 can feed material, for example TEFLON®, to the co-extrusion die to produce an outer tubing within which the aforementioned polymeric tube of materials A and B is contained. Preferably, the material transported by extruder 4 has a glass transition or melt temperature significantly above the glass transition temperatures of materials A and B, and also above the temperature at which it is planned to have the additives diffusing in materials A and B. In a specific embodiment, a thermally processable polymeric material with melt temperature above about 200° C. can be used as an outer tubing. Depending upon the extrusion rate and the choice of outer tubing material, it may be necessary to effect substantial external cooling to the tube as indicated in FIG. 2b.

Referring to FIG. 6, the outer tubing material can be extruded from a die which has the well-known basic features of a "wire-coating die." A ram extruder is normally used for TEFLON®. Accordingly, as a ram extruder involves an inherent batch process, there can be drawbacks to utilizing TEFLON® for an embodiment of the subject invention pertaining to a continuous production process. The TEFLON® fluoropolymer resins (DuPont) have a unique combination of properties including excellent chemical stability, anti-stick characteristics, mechanical strength, low flammability and low water absorption. Most importantly, they also have high melt temperatures, for example >250° C. The processing temperatures for these resins are typically ≧300° C. Thus, the die body for a TEFLON® outer tubing can be operated at about 325° C., which is much higher than that (typically 210° C.) of the die body for the polymeric tube material. This difference of about 115° C. between the two parts of the total die shown in FIG. 3b can be addressed with good insulation between the two parts. This insulation can be achieved by, for example, the use of an air gap created by several stainless steel rings which separate the two parts. Other ring materials, such as ceramic rings can also be utilized. Other means for insulating the two parts can be utilized as well. With this design, it is possible to independently control the temperatures of the two die parts in the temperature range of interest.

Although TEFLON® has some attractive properties for use as an outer tubing, such as resistance to water penetration into the GRIN POF, it is not an easily processed material. For this reason, other materials may be better suited for use as an outer tubing. In particular, cross-linked polyolefins such as polyethylene or polypropylene may be employed. These materials have been routinely used as jacket materials for conventional step-index plastic optical fiber and for jackets for the wire and cable industry. These cross-linked jackets can be produced by reactive extrusion. There is a variety of ways in which the catalysts and curing agents can be compounded into the polyolefin matrix. In a specific embodiment of the subject invention, the active agents can be injection into the melt stream after the melt stream has left the screw in the extruder. A static mixer can disperse the activator in the melt stream before it enters the die. The die can then be used as the high-temperature heat source for effecting the cross-linking of the jacket. The die may also be fitted with electrode structures for more efficient dielectric heating of the jacket melt stream if very high throughput is required.

It should be understood that there is a class of high temperature polymers that have high glass transition and melt temperatures and high decomposition temperatures, and are difficult to ignite or feed any flame. Some of these are cross-linked as discussed above. A polymer such as polybutyleneterephalate (PBT) has a melt temperature of 225° C. and can be extruded at 265° C. This polymer has been used extensively as a jacket for glass fiber. It exhibits excellent mechanical stability up to at least 170° C. and has high tensile strength. To increase its flexibility, it has been found useful to copolymerize it with small amounts of diol. Since this material is available at low cost, it is a suitable material choice.

It is well known in the art of wire coating dies how to provide the same velocity of extrudate at each point around the circumference at the die exit, and thereby have a fixed outer tubing wall thickness.

Figure 3A:
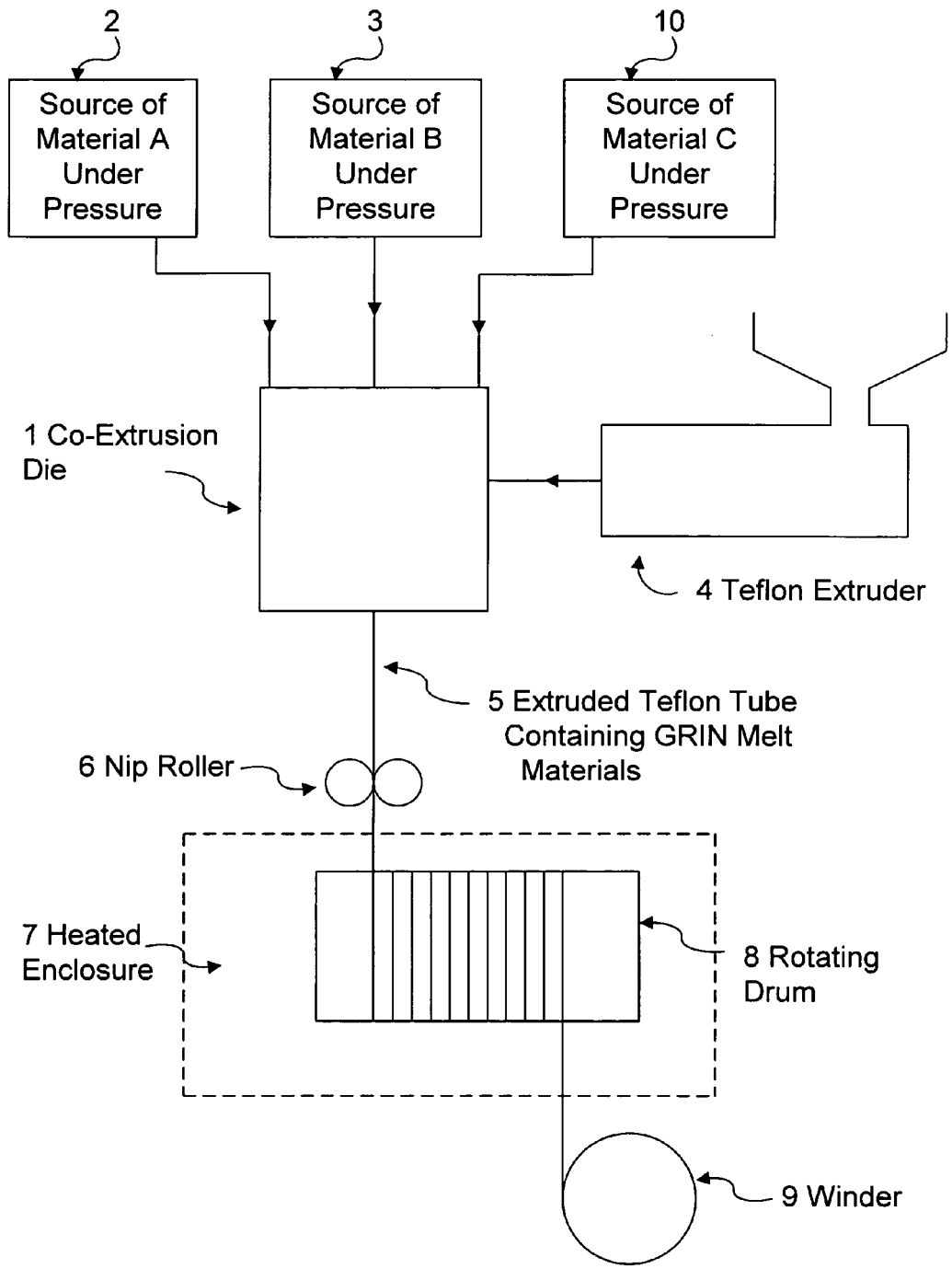
FIG. 3a shows a schematic illustration of an apparatus for manufacturing optical fiber using three melts in accordance with the subject invention.
Figure 3B:
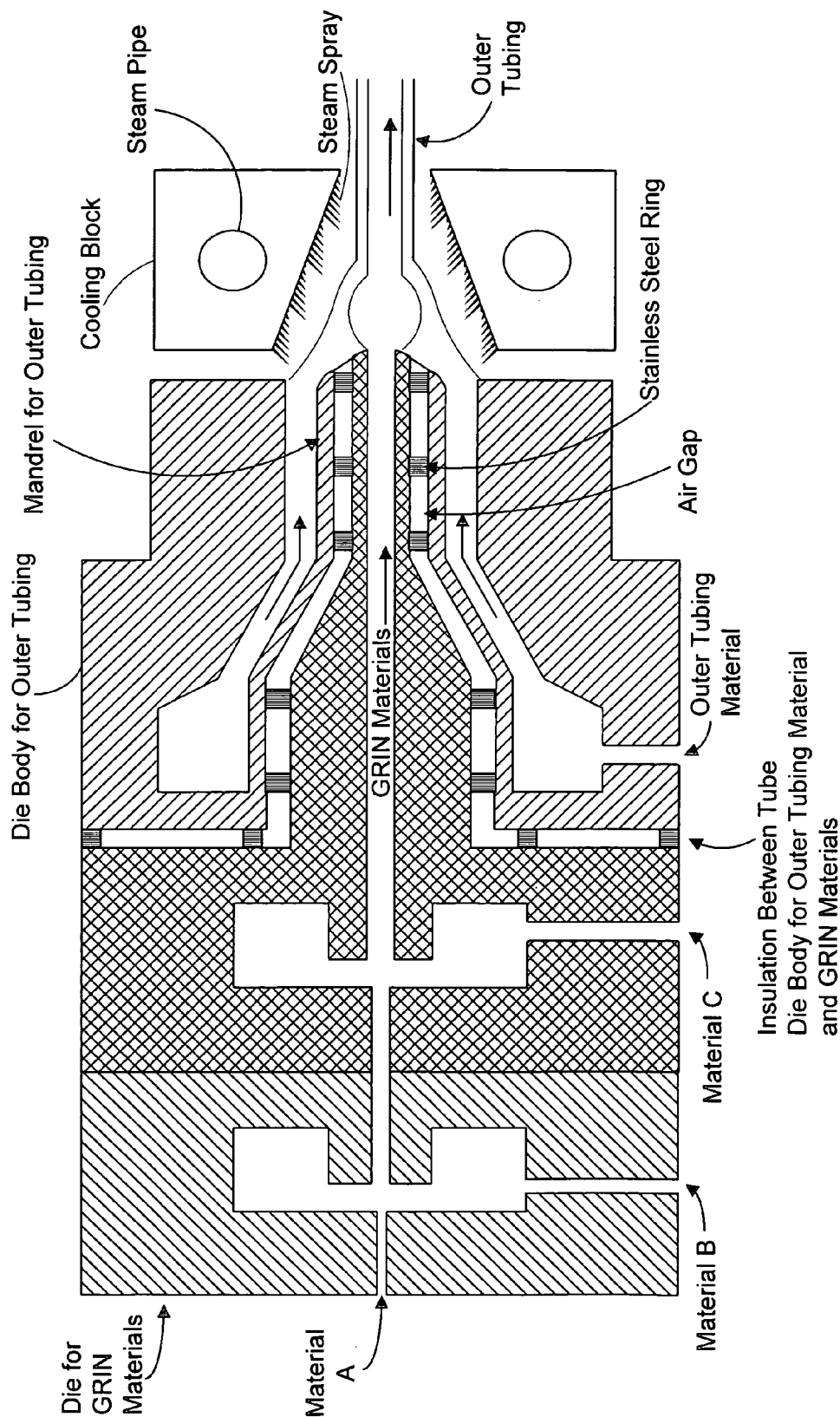

As the polymeric tube, or GRIN melt, material exits its die, some swell of the material can occur, as indicated in FIGS. 2b and 3b. The velocity of the GRIN material after the swell, is made similar to that of the outer tubing material. In a specific embodiment utilizing TEFLON® as an outer tubing material, it is desirable to rapidly cool the TEFLON® melt from the 325° C. temperature at the die exit down to the GRIN melt temperature of about 210° C. The wall thickness of the TEFLON® tube can be made to be in the range 25 to 200 microns, so that it can be rapidly cooled to 210° C. by a steam mist immediately after exiting the die.

In an alternative embodiment, there are some operational advantages in decoupling the production of polymeric tube material (e.g. GRIN fiber) from the outer tubing. For example, the outer tubing die can be located some distance (typically 1 to 4 meters) downstream from the polymeric tube die. This arrangement permits the solidification of the GRIN fiber, careful measurement of its diameter with a laser micrometer and feedback of this information to control fiber diameter. This well-defined solid fiber can then be passed through the tube die and provided with a thin coat of, for example, TEFLON®. The resulting tube-encased fiber can then be admitted to the heated enclosure whose temperature is preferably 25° C. to 60° C. above the glass transition temperature of the GRIN material and at least 30° C. below the melt temperature of the TEFLON® tube. In this way, the GRIN material's structural integrity is maintained and yet there is high enough diffusivity of the additives to produce the desired index profile in a reasonably short period of time. In a further alternative embodiment, the polymeric tube can be produced and stored with the outer tubing applied at any later time, followed by heating for diffusion.

The diffusion of additives originally in materials A and/or B into the adjacent melts B and A depends principally on the diffusion constants of the additives in the chosen polymers, the temperatures of the melts, and the time over which diffusion is taking place.

An important dimensionless parameter which enters into the description of the additive diffusion is:

$$\frac{tD}{d^2}$$

where t (sec) is the time over which diffusion is occurring, D(cm²/sec) is the diffusion constant of a specific additive in a given polymer at a given temperature and d(cm) is the distance over which diffusion has occurred. When this parameter $$\frac{tD}{d^2}$$

is of order unity then significant diffusion has occurred.

Typical values of D for the additives of interest are in the range $10^{-6}$ to $10^{-7}$ cm²/sec. Thus, for the required axial distance (≈0.1 mm) over which diffusion is required as discussed earlier, diffusion times on the order of t≈100 to 1,000 sec. should suffice. Additives with low diffusion constants are optimal for use in fiber whose operational specifications call for high thermal stability. These additives may be used in the subject invention by using either longer dwell time of the fiber in the heating enclosure, and/or smaller diameter fiber for a given dwell time in the heating enclosure.

Due to the cylindrical symmetry of a cylindrical plastic GRIN fiber, it is possible to perform a reliable and accurate numerical simulation of the diffusion process (Tsai, et al., 1997). Since the diffusion process depends on several parameters, it is highly desirable to have a reliable predictive method to closely determine the parameters necessary to achieve the desired profile, such as a parabolic refractive index profile, at the proposed extrusion conditions. In the other frequently encountered case of a desired pseudo step-index profile, the required diffusion time may be substantially reduced. The resulting index profile is a steep but not discontinuous step profile which reduces the light scattering at the core/clad boundary.

The material extruded from the die 1 can be cooled, drawn by nip rollers 6 and wound up by a rotating drum 8 which is within a heated enclosure 7. In another embodiment of the subject invention, the material extruded from the die 1 can be wound around two rotating elongated godet wheels in a manner well known in the art. For a desired fiber production rate of 5,000 meters per hour, approximately 140 meters of fiber can be wound on the drum 8 to provide a 100-second duration of the fiber in the heated enclosure 7. This is easily accomplished with, for example, 140 turns around a 32 cm diameter drum. Fiber take-off from the drum 8 can be taken up on a winder 9 or stretched in a manner known in the art to improve mechanical properties of the fiber. The fiber may be jacketed with, for example, a fire-resistant polymeric material which also provides additional mechanical strength. This is achieved by the use of an additional "wire coating die" through which the fiber is fed before being wound on to the final spool.

In some applications, it may be desired to further enhance thermal and mechanical long-term stability of the fiber. In this case, some cross-linking of the fiber material may be produced by ultra-violet or some other form of ionizing radiation. The region of the drum, corresponding to the end of the period of the fiber in the enclosure is particularly useful for this purpose and may be exposed to continuous radiation to effect the cross-linking. Up to a few percent bifunctional acrylates and methacrylates and less than 1% photo-initiator can be added to the polymer melts at the same time as are the additives. Examples of such compounds are polyethylene glycol acrylate with molecular weight varying from 258 to 700 and polyethylene glycol methacrylate with molecular weight varying from 330 to 875. Photo-initiators which may be used are benzoin methyl ether and benzoin ethyl ether. Irradiation may be supplied by several ultraviolet lamps located around the later section of the drum. The lamps are designed to emit between 350 and 400 nm. The thin TEFLON® tubing can easily permit the uv-light to reach the polymer melts and trigger the cross-linking polymerization of the bifunctional monomer.

FIG. 3b is a schematic of a die for the case of using three melt blended materials. The method of operation of the die is the same as that in FIG. 2b except for the addition of material C which forms a concentric shell around material B as indicated in FIG. 3b. The subject invention also pertains to four or more melts. In addition, although FIGS. 2b and 3b show two die structures, other die structures can be utilized in accordance with the subject invention to produce multiple concentric cylinders of polymeric materials.

The fiber produced may have its refractive index increase or decrease as a function of radius, or in a particular case, may exhibit a local minimum at a radius intermediate between the axis and the outer radius. In the latter case, the refractive indices of the respective melts must be in the relationship $n_A > n_C > n_B$. In the same way, a variety of refractive index profiles may be formed.

In a specific implementation of the present invention, there are several important considerations in the choice of materials for manufacturing thermally stable, large numerical aperture GI-POF. These considerations are listed for the case of a three melt polymer system, but they can easily be extended to the cases of two or greater than three polymer systems:

1. The desired numerical aperture defines the difference in refractive index on the axis and the outside radius of the GI-POF.

Figure 4:
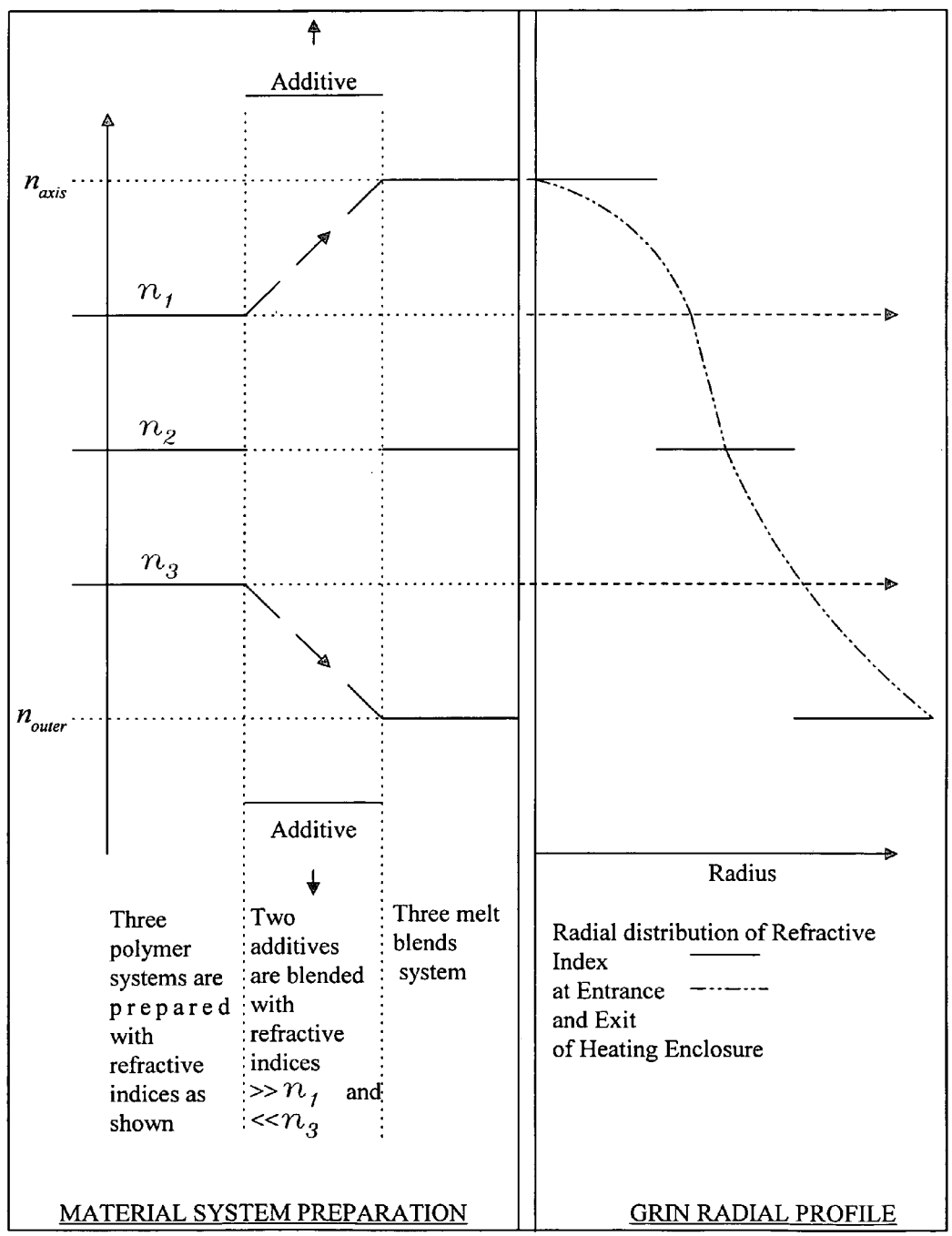
FIG. 4 illustrates the strategy of material preparation and development of the index profile in accordance with a specific embodiment of the subject invention.

2. The refractive index range should be considered for design purposes to be divided into four approximately equal ranges as shown in FIG. 4.

3. Three polymers or copolymers should be prepared with refractive indices, $n_A$, $n_B$, and $n_C$, as indicated on the left side of FIG. 4.

4. Two low molecular weight additives whose refractive indices are desired to be $\gg n_A$ and $\ll n_C$ are blended with their respective polymer matrices. The minimal amounts of additive are used to achieve the desired refractive indices, $n_{axis}$ and $n_{outer}$. These additives and blends are indicated schematically in Columns 2 and 3 of FIG. 4.

5. The three melt blends, A, B, and C, are formed as concentric cylinders around each other by the die in FIG. 3b. In the heated enclosure, the additives partially diffuse from the inner and outer blends into the central melt to produce a refractive index profile as indicated by the dashed line in FIG. 4 in the final product.

6. By varying the flow rates of materials A, B, and C, considerable control can be exercised on the final index profile during the extrusion process.

The simplicity of the concentric symmetry of the melt blends in the tube permits accurate, efficient predictions to be made for the final GI-POF profile. This is important due to the large number of parameters which affect the operation and the desire to quickly achieve production status of the manufacturing process.

In a specific implementation of the invention, the outermost cylinder of melt can be made to contain no additive. Its refractive index can be either higher or lower than that of the adjacent melt cylinder. These two arrangements are shown schematically in FIGS. 5a and 5b for a four-melt system. The purpose of the additional melt cylinder is to permit diffusion of additive from the adjacent cylinder, thereby minimizing the radial extent over which the GRIN profile deviates from a parabolic profile. The two final profiles of the above two arrangements are shown schematically in FIGS. 5a and 5b. In the former of the two alternatives, the refractive index has a minimum value at a given radius and any light extending beyond that radius is defocused and lost as desired.

Figure 5A:
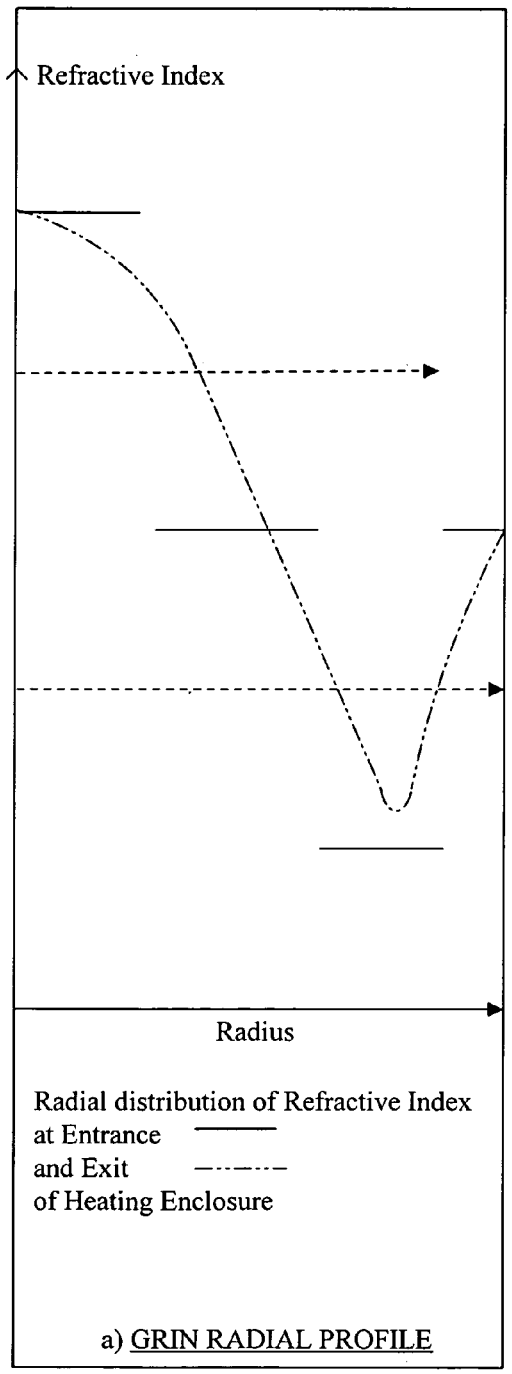
FIG. 5a shows GRIN profile modifications due to a fourth layer of melt polymer with a higher refractive index and not containing and additives in accordance with a specific embodiment of the subject invention
Figure 5B:
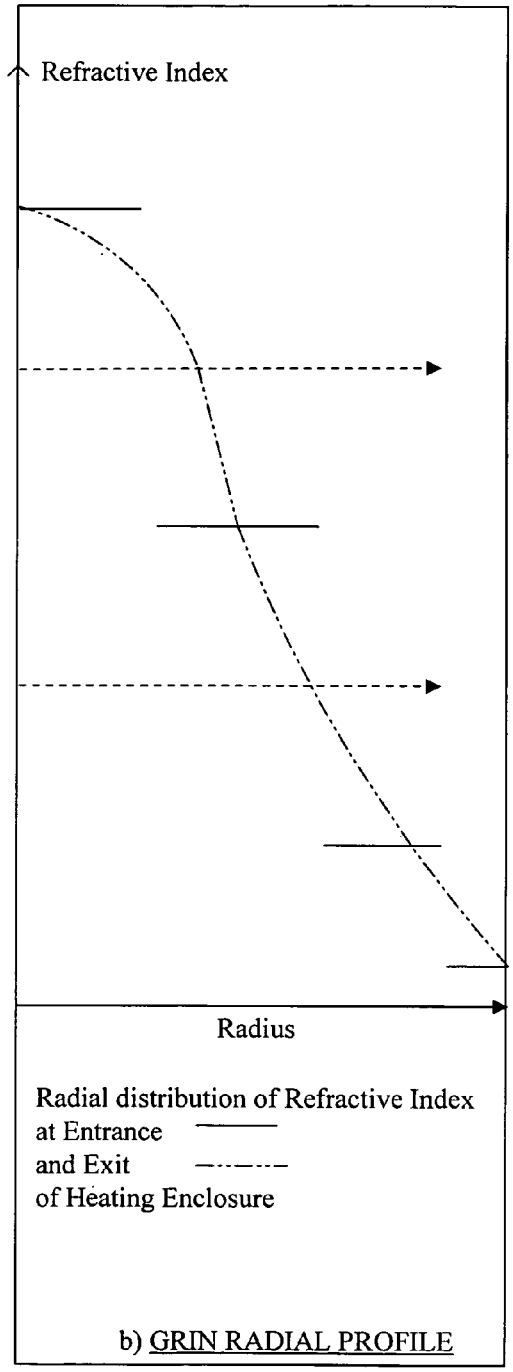
FIG. 5b shows GRIN profile modifications due to a fourth layer of melt polymer with a lower refractive index and not containing any additives in accordance with a specific embodiment of the subject invention.

In another embodiment of the subject invention, the third and fourth, or just the fourth, melt cylinders can be made opaque and with refractive indices as shown in FIGS. 5a and 5b. In this case, the light will not be transmitted in the radial region which exhibits substantial inversion of the second derivative of the refractive index profile. In this way, the refractive index profile may be made very close to parabolic out to the maximum radius that light is transmitted.

In the latter of the two arrangements, the radial region is reduced over which a deviation from a parabola occurs as desired. In summary, in both arrangements, use of an additional melt cylinder ensures that the light is transported by a GRIN profile which is closer to a parabolic shape.

Due to very high modal mixing in plastic optical fiber (Koike, Y., 1998), there is not a tight constraint on the GRIN profile to achieve high bandwidth (Shi, R. F., et al., 1997). Nevertheless, the above implementation of an additional melt cylinder is helpful to achieve the highest possible bandwidth and lowest possible bit error rate for this type of fiber. In a specific implementation, the TEFLON® tube used primarily for providing structural integrity during the diffusion process may be employed for the above purpose. Even though the TEFLON® tube is below its melt temperature in the heating enclosure, there is some diffusion of additive into it from the GRIN material.

Figure 6A:
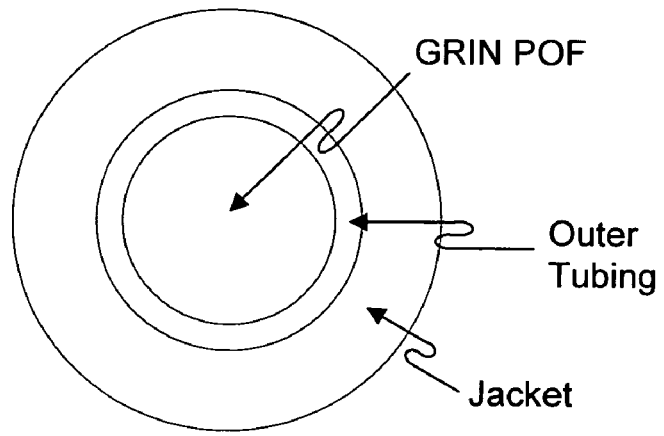
FIG. 6a Shows a cross-section of a GRIN-POF having an outer tubing and a jacket in accordance with the subject invention.

In another embodiment of the subject invention, POF can be manufactured as cable with a protective polymeric jacket surrounding the light-transmitting fiber. A typical GRIN POF cable structure is shown in FIG. 6a. A GRIN POF with surrounding outer tubing has been jacketed by being passed through a "wire coating" die and having a surrounding polymeric material extruded to form a jacket.

In a specific embodiment, jacketing may be performed after the GRIN POF having an outer tubing exits from the heated enclosure 7 before being finally wound on a winder 9 as shown in FIG. 3a.

Figure 6B:
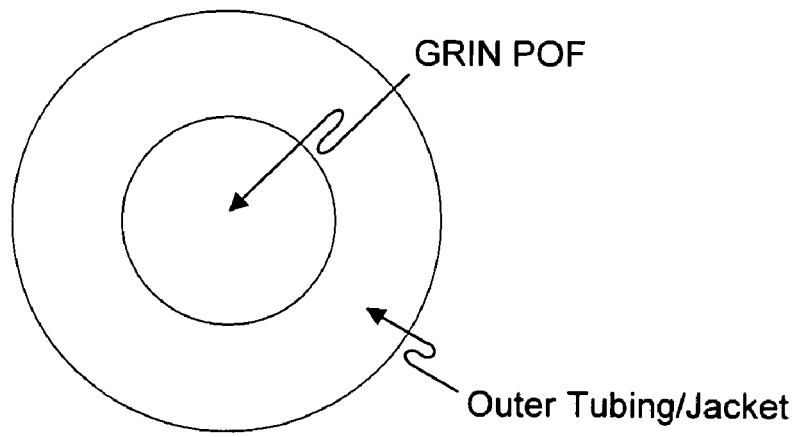
FIG. 6b Shows a cross-section of a GRIN-POF having a jacket acting as an outer tubing in accordance with the subject invention.

In a different embodiment of the subject invention, the outer tubing extruder 4 in FIG. 3a can instead produce a jacket, rather than a thin-walled outer tubing, with say a 2.2 mm diameter as shown in FIG. 6b.

The jacketed GRIN POF may be passed through the heated enclosure before being wound by the winder, 9, in FIG. 3a.

Figure 7A:
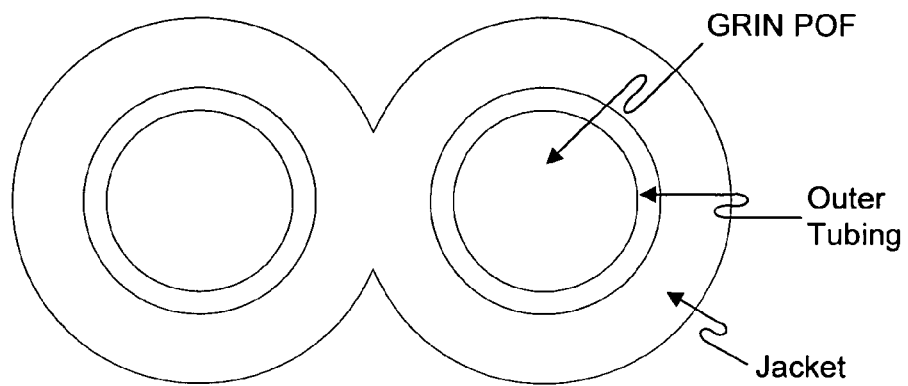
FIG. 7a Shows a cross-section of two GRIN POF's with each surrounded by an outer tubing and a jacket surrounding and holding together the fibers in accordance with the subject invention.

In a further embodiment of the subject invention, duplex (two parallel, slightly separated optical fibers) GRIN POF may be produced with a jacket as shown in FIG. 7a. In this case, two GRIN POF may be produced and have an outer tubing applied and passed through the heating enclosure as described earlier. The two GRIN POF may then be drawn through a cross-wire die to be jacketed.

Figure 7B:
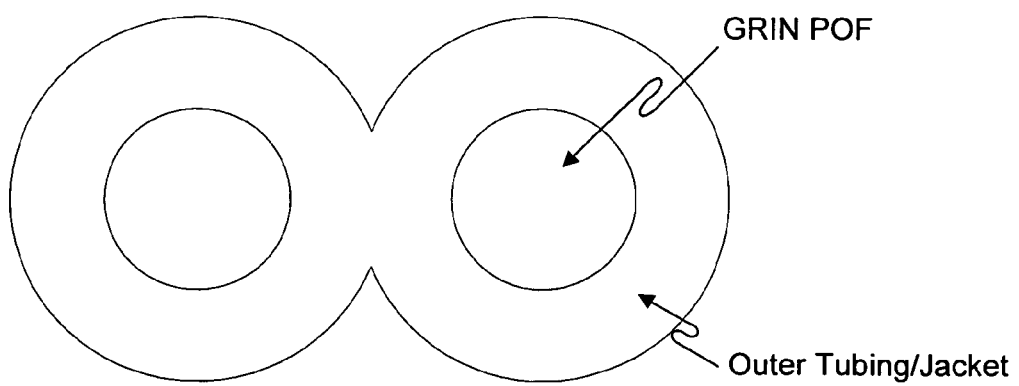
FIG. 7b Shows a cross-section of two GRIN POF's with a jacket acting as an outer tubing and holding the fibers together in accordance with the subject invention.

Alternatively, the dies shown in FIG. 2b or 3b may be modified by methods well known in the art of multifiber extrusion to simultaneously extrude two separate streams of polymeric tube material, each of which is composed of concentric cylinders of melt. The outer tubing die may be used to extrude a jacket for the duplex GRIN POF as discussed earlier for the single, or simplex, GRIN POF. A cross-section of the duplex fiber produced in this way is shown in FIG. 7b.

In another embodiment of the invention, a number, n, where n>2, GRIN POF fibers may be extruded simultaneously to form a variety of arrangements of fibers. The arrangements of fibers may be jacketed by the methods described above. Such arrangements may be useful in the very large bandwidth transmission of data through the multiplicity of fibers.

GRIN POF may be produced with different diameters in the range 0.1 mm up to about 5.0 mm. Such fiber may be termed rod rather than fiber. When cut into particular lengths and the ends polished, this type of rod may be used as a lens as is well known in the art.

Samples of fiber were evaluated as follows. Each end of a sample was cut by a diamond tool rotating at high speed to produce an optically flat surface at right angles to the fiber axis. The surface was polished using increasingly fine grit down to 0.2 micron powder. The refractive index profile was measured by observing the light reflection intensity as a function of radius from the end of the fiber by the method well known in the art.

EXAMPLE 1

It is a preferred embodiment of the present invention to manufacture GI-POF which is stable in the temperature range −40° to +85° C., has an optical attenuation ≦150 dB/km, a parabolic refractive index profile, and a numerical aperture of ~0.15.

The considerations described earlier on the choice of materials are followed in detail. Polymethylmethacrylate is chosen as the polymer with the median refractive index, i.e., $(n_{axis}+n_{outer})/2=1.492$. The desired numerical aperture of ~0.15 may be written as $$0.15 = \frac{1}{\sqrt{2}} \sqrt{(n_{axis}^2 - n_{outer}^2)}$$

which yields $n_{axis}=1.500$ and $n_{outer}=1.484$.

The refractive indices of the three polymer matrices are then selected as 1.496, 1.492, and 1.488. These index values are shown in the third column of Table 5 and the choices of monomers to achieve these indices are shown in column 1. The resulting glass transition temperatures of the polymers are given in column 2.

Additives are chosen with indices of 1.63 and 1.305 so as to minimize the amount of additive needed (≦3% by weight) to achieve the required refractive indexes of the blends which are shown in the last column. The effect of the additives on the glass transition temperature of the polymer matrices is to depress their Tg's by less than about 10° C. as indicated in FIG. 1.

TABLE 5

The Polymeric and Additive Materials are shown for a Three-Component Melt System for Producing a GI-POF With Numerical Aperture Equal to 0.15 and Glass Transition Temperature Greater Than 85° C.

| Polymer Matrix | | | Additive | | | Effect on Additive | | Material Blend Containing (co)polymer Plus Additive | |
|---|---|---|---|---|---|---|---|---|---|
| Monomer Material | Glass Transition Temp. (° C.) | Refractive Index | Material | Refractive Index | Required % w of Additive | Tg (° C.) from Additive | Tg (° C.) | Refractive Index |
| 95% w MMA + 5% w PMA | 101.5 | 1.496 | Diphenyl Sulphide | 1.63 | 3.0% | −10.5 | 91 | 1.50 |
| MMA | 101 | 1.492 | | | | | 101 | 1.492 |
| 95.5% w MMA + 4.5% w 3FMA | 100.1 | 1.488 | Methyl perfluoro-octanate | 1.305 | 2.0% | −7.1 | 93 | 1.484 |

The three materials have glass transition temperatures of 91° C., 101° C., and 93° C. The fact that the Tg of all parts of the GI-POF is greater than 90° C. is a preferable condition for high thermal stability of the fiber. A second condition for achieving thermal stability of the profile is that the additives be chosen for their chemical affinity for their polymeric matrices. In the case of diphenyl sulphide, the electronic structure of the sulphur atom provides a weak bond to an oxygen atom in the ester unit of the polymers. This bond tends to immobilize the additive at temperatures below the material glass transition temperature. In the case of the methyl perfluorooctanate, there is a direct attraction between the ester units which are present in the additive and the polymer. Once more, this weak bond provides a degree of immobilization of that additive at temperatures below the material glass transition temperature.

The three monomer systems were placed in three tubes with the addition of 0.3% by weight of benzoil peroxide (BPO) acting as initiator, 0.05% by weight of normal butyl mercaptan (nBM) acting as a chain transfer agent. The diphenyl sulphide additive at 3.0% w was dissolved in the high refractive index monomer mix and the additive methyl perfluorooctanate at 2.0% w was added to the low refractive index monomer mix. The solutions were heated to 55° C. for 15 hours, 75° C. for 5 hours, 100° C. for 10 hours, and 150° C. for 24 hours. At that time, 99% conversion to polymer was measured. A piston on top of each melt exerted 21 kg/cm$^2$ pressure to force the melts into the die depicted in mixtures by weight of MMA and TFA. In this way, the polymeric matrix was partially fluorinated at all radii throughout the fiber. Reduced water absorption in the fiber which enhances the long-term stability of the fiber. Additives of diphenyl sulphide and methyl perfluorooctanate are mixed with two of the monomer solutions as shown in Table 6. In this case, the glass transition temperatures of all three polymer systems are greater than 95° C. The range of refractive indices is made somewhat greater than that in Example 1.

Polymerization and extrusion of the melts were carried out in a manner identical to Example 1. GRIN fiber of 0.5 mm diameter was produced at 100 m/minute and maintained in the heating enclosure at 150° C. for 150 seconds. After exiting from the enclosure, the TEFLON®-coated GRIN fiber passed through a "wire coating die" and was jacketed with a layer of polyethylene. As a result, the refractive index of the fiber was measured to have a similar shape as before. The numerical aperture of the fiber was measured to be 0.17.

TABLE 6

The Polymeric and Additive Materials are shown for a Three-Component Melt System for Producing a GI-POF with Numerical Aperture Equal to 0.17 and Glass Transition Temperature Greater Than 95° C.

| Polymer Matrix | | | Additive | | | | Material Blend Containing (co)polyer Plus Additive | |
|---|---|---|---|---|---|---|---|---|
| Monomer Material | Polymer Glass Transition Temp. (° C.) | Refractive Index | Material | Refractive Index | % w of Additive | Effect on Tg (° C.) from Additive | Tg (° C.) | Refractive Index |
| 89% w MMA + 11% w TFA | 105.1 | 1.481 | Diphenyl Sulphide | 1.63 | 3.0% | −10 | 95.1 | 1.485 |
| 84% MMA + 16% TFA | 106.9 | 1.476 | | | | | 106.9 | 1.476 |
| 79% w MMA + 21% w TFA | 108.8 | 1.471 | Methyl perfluoro-octanate | 1.305 | 3.0% | −10 | 98.8 | 1.466 |

FIG. 3b. The diameter of the hole was 2 mm from which the GRIN material exited to enter the TEFLON® outer tubing.

The temperature of all three melts was 210° C. as they entered the die depicted in FIG. 3b. GRIN fiber was extruded with an outer tube diameter of 0.75 mm from the die hole of 2.0 mm diameter. Fiber was extruded at 100 m/minute and was retained in the heating enclosure at 150° C. for 250 seconds.

Fiber samples were prepared and measurements performed as described earlier. The measured refractive index parabolic profile was found to be well represented by the profile depicted in FIG. 4.

EXAMPLE 2

In the same manner as Example 1, three monomer systems were prepared using the same initiator and chain transfer agent. The three monomer systems were different

EXAMPLE 3

In this embodiment, only two rather than three different material systems were used.

Extrusion was carried out using the die shown in FIG. 2b. The material system used in this example is shown in Table 7. The additives used are diphenyl sulphide and methyl perfluorooctanate with concentrations given in Table 7. The monomers and additives are mixed, polymerized, and extruded as described in Example 1. All other parameters in extrusion and heating enclosure were similar to those in Example 1.

The maximum difference in refractive index of the blend materials is 0.018 which provides a numerical aperture of about 0.16. The general shape of the refractive index distribution was as before in Example 1.

TABLE 7

The Polymeric and Additive Materials are shown for a Two-Component Melt System for Producing a GI-POF with Numerical Aperture Equal to About 0.16 and Glass Transition Temperature Greater than 90° C.

| Polymer Matrix | | | Additive | | | | Material Blend Containing (co)polymer Plus Additive | |
|---|---|---|---|---|---|---|---|---|
| Monomer Material | Polymer Glass Transition Temp. (° C.) | Refractive Index | Material | Refractive Index | Required % w of Additive | Effect on Tg (° C.) from Additive | Tg (° C.) | Refractive Index |
| 90% w MMA + 10% w PMA | 101.9 | 1.500 | Diphenyl Sulphide | 1.63 | 3.0% | −10 | 91.9 | 1.504 |
| 100% MMA | 101 | 1.492 | MPF | 1.305 | 3.0% | −10 | 91.0 | 1.486 |

EXAMPLE 4

It is an object of this example to produce a 1 mm diameter step index polymer optical fiber with improved transmission and high temperature stability. This is achieved by reducing the loss of light from scattering at the discontinuity at the core cladding interface. It is desirable to have the distance, over which the index changes, be much greater than the wavelength of the light, say 20 μm of radial distance.

95% w methylmethacrylate and 5% w ethylmethacrylate mixture is used as the core material and 100%/w trifluoroethylmethacrylate is used as the cladding material. To preserve high temperature performance of the fiber, it is preferable to use low molecular weight additive in the thin cladding material. The chosen additive is 3% w of methyl perfluorooctanate which has a molecular weight of 428.

The monomers and additive were polymerized as in Example 1 and extruded through the die system shown in FIG. 2b. The diffusion of the additive into the core material was small at the high extrusion speed of 100 meters per minute and a residence time of the fiber in the heated enclosure of only 10 seconds. The refractive index profile of the fiber was uniform in radius out to 0.460 mm where it started to fall rapidly to about 1.416 over a distance of 20 μm. At a radius from 0.480 mm to 0.500 mm, the cladding polymer trifluorethylmethacrylate determined the refractive index.

EXAMPLE 5

It is an object of this example to provide a manufacturing method of perfluorinated GRIN fiber using CYTOP® polymer. The material compositions for the dual component system is shown in Table 8. The glass transition temperature of the fiber is 95° C. and the numerical aperture is 0.10. TEFLON® material may again be used to form a tube as in Example 1. The diameter of the as-spun perfluorinated GRIN material was 0.25 mm and the necessary residence time in the 150° C. heated enclosure was about 100 seconds.

The primary advantage of the use of perfluorinated material lies in the low light absorption in the range 850 nm to 1500 nm.

TABLE 8

The Polymeric and Additive Materials Are Shown for a Two-Component Melt System for Producing A Perfluorinated GI-POF with Numerical Aperture Equal to 0.10 and Glass Transition Temperature of 95° C.

| Polymer Matrix | | | Additive | | | | Material Blend Containing (co)polymer Plus Additive | |
|---|---|---|---|---|---|---|---|---|
| Monomer Material | Polymer Glass Transition Temp. (° C.) | Refractive Index | Material | Refractive Index | Required % w of Additive | Effect on Tg (° C.) from Additive | Tg (° C.) | Refractive Index |
| CYTOP | 108 | 1.340 | Pentafluoro phenyl sulfide | 1.395 | 4.0% | −13 | 95.0 | 1.3422 |
| CYTOP | 108 | 1.340 | Perfluoro-polyether | 1.295 | 4.0% | −13 | 95.0 | 1.3382 |

EXAMPLE 6

It is an object of this example to provide a method of manufacturing a perfluorinated GRIN fiber using DuPont AF® amorphous polymer. An example of a material composition for a dual component system is shown in Table 9. Since the glass transition temperature of AF material is so high ($\geq 140°$ C.) and processing temperatures are correspondingly very high ($\geq 280°$ C.), it is highly advantageous to use a substantial amount of additive to significantly lower these temperatures. In this way, a heated enclosure temperature (190° C.) can be chosen which is well above the glass transition temperature of the GRIN material (120° C.) and yet well below the melt temperature of the TEFLON® tube (>250°). The diameter of the as-spun fiber is chosen to be 0.25 mm and the necessary residence time in the 190° C. heated enclosure is about 100 seconds as in Example 6. As in the previous example, the primary interest in this type of fiber is its high light transmission in the wavelength range 850 nm to 1500 nm.

TABLE 9

Material Compositions for a Two-Component Material System Employing DuPont AF ® Polymer for a Perfluorinated GRIN Fiber with Numerical Aperture of 0.18

| Polymer Matrix | | | Additive | | | | Material Blend Containing (co)polyer Plus Additive | |
|---|---|---|---|---|---|---|---|---|
| Monomer Material | Glass Transition Temp. (° C.) | Refractive Index | Material | Refractive Index | % w of Additive | Effect on Tg (° C.) from Additive | Tg (° C.) | Refractive Index |
| AF(160) | 160 | 1.310 | Pentafluoro phenyl sulfide | 1.3954 | 12% | −40 | 120 | 1.3202 |
| AF(160) | 160 | 1.310 | Perfluoro polyether | 1.295 | 12% | −40 | 120 | 1.3082 |

It is to be understood that while the invention has been described in conjunction with the detailed description thereof, that the foregoing description is intended to illustrate and not limit the scope of the invention, which is defined by the scope of the appended claims.

All patents, patent applications, provisional applications, and publications referred to or cited herein are incorporated by reference in their entirety to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims.

The invention claimed is:

1. A method of manufacturing a plastic optical transmission medium with a radially varying refractive index, comprising:
    preparing a polymeric tube having at least two concentric cylinders of polymeric material, wherein at least one of said at least two concentric cylinders of polymeric material comprises a diffusible additive which modifies the refractive index of said at least one of said at least two concentric cylinders of polymeric material;
    surrounding said polymeric tube with an outer tubing, wherein said outer tubing has a higher glass transition temperature than any of said at least two concentric cylinders of polymeric material;
    heating said polymeric tube surrounded by the outer tubing to a temperature which is below the glass transition temperature of the outer tubing and above all of the glass transition temperatures of said at least two concentric cylinders of polymer material, wherein such heating causes diffusion of the diffusible additive in said at least one of said at least two concentric cylinders of polymeric material, wherein such diffusion of the diffusible additive modifies the radial refractive index of said polymeric tube,
    wherein the method is continuous, wherein heating said polymeric tube surrounded by the outer tubing comprises continuously passing said polymeric tube surrounded by the outer tubing through a heated enclosure,
    wherein continuously passing said polymeric tube surrounded by the outer tubing through a heated enclosure comprises:
    continuously admitting said polymeric tube surrounded by the outer tubing into the heated enclosure;
    continuously winding said polymeric tube surrounded by the outer tubing onto a drum, wherein the drum is located within the heated enclosure;
    retaining said polymeric tube surrounded by the outer tubing in the heated enclosure for a duration of time adequate to achieve a desired radial refractive index profile of said polymeric tube as said polymeric tube surrounded by the outer tubing is being wound on the drum;
    and continuously unwinding the polymeric tube surrounded by the outer tubing from the drum.

2. The method according to claim 1, wherein the diffusible additive is nonpolymerizing.

3. The method according to claim 1, wherein said polymeric tube comprises an inner cylinder of polymeric material and an outer cylinder of polymeric material, wherein said inner and outer cylinders are concentric.

4. The method according to claim 3, wherein said inner cylinder of polymeric material comprises a diffusible additive which raises the index of refraction of said inner cylinder of polymeric material.

5. The method according to claim 3, wherein said outer cylinder of polymeric material comprises a diffusible additive which lowers the index of refraction of said outer cylinder of polymeric material.

6. The method according to claim 3, wherein said polymeric tube comprises a middle cylinder of polymeric material which is between, and concentric with, said inner cylinder of polymeric material and said outer cylinder of polymeric material.

7. The method according to claim 6, wherein said inner cylinder of polymeric material comprises a first diffusible additive which raises the index of refraction of said inner cylinder of polymeric material and said outer cylinder of polymeric material comprises a second diffusible additive which lowers the index of refraction of said outer cylinder of polymeric material.

8. The method according to claim 7, wherein said method produces a polymeric tube having an approximately parabolic radial index of refraction profile.

9. The method according to claim 1, wherein preparing a polymeric tube having at least two concentric cylinders of polymeric material comprises:
    preparing a corresponding at least two polymeric materials under pressure, wherein at least one of said at least two polymeric materials comprises a diffusible additive which modifies the refractive index of said at least one of said corresponding at least two polymeric materials;
    injecting said corresponding at least two polymeric materials into an extrusion die, wherein said polymeric tube having at least two concentric cylinders of polymeric material is extruded from said die.

10. The method according to claim 1, wherein said at least two concentric cylinders of polymeric material comprise the same kind of polymer.

11. The method according to claim 1, wherein at least two of the at least two concentric cylinders of polymeric material comprise different kinds of polymers.

12. The method according to claim 11, wherein the two different kinds of polymers have refractive indices $n_1$ and $n_2$ such that $n_1 > n_2$, wherein two non-polymerizing additives with refractive indices $n_1^1$ and $n_2^1$ such that $n_1^1 > n_1$ and $n_2^1 < n_2$ are added with the two different kinds of polymers, respectively, and wherein the plastic optical transmission medium has a refractive index profile which is substantially parabolic.

13. The method according to claim 11, wherein the two different kinds of polymers have refractive indices $n_1$ and $n_2$ such that $n_1 \geq n_2$, wherein a non-polymerizing additive with the refractive index $n_2^1$ such that $n_2^1 < n_1$ is added with the polymer having refractive index $n_2$, and wherein the plastic optical transmission medium has a refractive index profile which varies only over a short distance around the interface between the two polymers.

14. The method according to claim 11, wherein the two different kinds of polymers have refractive indices $n_1$ and $n_2$ such that $n_1 \geq n_2$, wherein a non-polymerizing additive with the refractive index $n_1^1$ such that $n_1^1 > n_1$ is added with the first polymer having refractive index $n_1$, and wherein the plastic optical transmission medium has a refractive index profile which varies only over a short distance around the interface between the polymers.

15. The method according to claim 1, wherein the polymeric tube comprises three concentric cylinders of polymeric material comprising a first, second, and third polymer, respectively, with refractive indices $n_1$, $n_2$, and $n_3$ such that $n_1 > n_2 > n_3$, wherein the first and third polymers have added non-polymerizing additives with refractive indices $n_1^1$ and $n^{31}$ such that $n_1^1 > n_1$ and $n_3^1 < n_3$, wherein the plastic optical transmission medium has a refractive index profile which is substantially parabolic.

16. The method according to claim 1, wherein the polymeric materials are melt-processable, amorphous materials.

17. The method according to claim 1, wherein the polymeric materials comprise a material selected from the group consisting of: polymethylmethacrylate, polyphenylmethacrylate, polytrifluoroethylmethacrylate, polycarbonate, polyfluoroacrylates, amorphous fluorinated polymers; poly2,2-bis(trifluoromethyl)-4,5 difluoro 1,3-dioxolinecotetrafluoroethylene, or poly2,2,4,5-tetrafluoro 1,3-dioxol-4,5-yl tetrafluoroethylene.

18. The method according to claim 1, wherein at least one of the diffusible additives increases the refractive index of organic polymers and is selected from the group consisting of benzophenome, biphenyl, 3-phenyltoluene, diphenyl sulphide and 1,2,4,5-tetrabromobenzene.

19. The method according to claim 1, wherein at least one of the diffusible additives increases the refractive index of perfluorinated polymers and is selected from the group consisting of: N-pentafluorophenyldichlomaleimide, octofluoronapthalene, and pentafluorophenyl sulfide.

20. The method according to claim 1, wherein at least one of the diffusible additives decreases the refractive index of organic polymers and is selected from the group consisting of: tributylphosphate, triethylphosphate, glycerol triacetate, methylperfluorooctanate, and perfluoro2,5,8-trimethyl-3,6,9-trioxadodecanoic acid methyl ester.

21. The method according to claim 1, wherein at least one of the diffusible additives decreases the refractive index of organic polymers and is selected from the group consisting of: perfluoropolyether, perfluorotrihexylamine, and perfluoropentadecane.

22. The method according to claim 1, wherein at least one of the diffusible additives decreases the refractive index of organic polymers and is selected from compounds with a methacrylate or acrylate functionality and a perfluorinated unit.

23. The method according to claim 1, wherein said plastic optical transmission medium has a glass transition temperature in excess of 90° C. at all radii.

24. The method according to claim 1, wherein said plastic transmission medium is able to operate with stability at temperatures up to 85° C.

25. The method according to claim 1, wherein said plastic optical transmission medium is a graded index plastic optical fiber having a glass transition temperature at all radii greater than 85° C.

26. The method according to claim 1, wherein said plastic optical transmission medium is a graded index plastic optical fiber having a numerical aperture greater than 0.1.

27. The method according to claim 1, wherein said plastic optical transmission medium is a graded index plastic optical fiber comprising perfluorinated polymers and perfluorinated low molecular weight compounds.

28. The method according to claim 1, further comprising inducing cross-linking in the polymeric material of the polymeric tube.

29. The method according to claim 28, wherein said cross-linking is accomplished by exposing the plastic optical transmission medium to ultra-violet radiation.

30. The method, according to claim 1,
    wherein continuously admitting said polymeric tube surrounded by the outer tubing into heated enclosed comprises admitting at a speed of at least 5000 meters/hour.

* * * * *

UNITED STATES PATENT AND TRADEMARK OFFICE
CERTIFICATE OF CORRECTION

PATENT NO. : 7,135,133 B2
APPLICATION NO. : 09/833833
DATED : November 14, 2006
INVENTOR(S) : James K. Walker et al.

It is certified that error appears in the above-identified patent and that said Letters Patent is hereby corrected as shown below:

Column 1,
Line 16, "Graded index plastic optical fiber (GI-POF) offers promise as a high bandwidth communication medium. The ability to create a desired index of refraction profile in a plastic optical fiber"
should read --Graded index plastic optical fiber (GI-POF) offers promise as a high bandwidth communication medium.--.

Column 3,
Lines 35-36, "not containing and additives" should read --not containing any additives--.

Column 14,
Table 5, last col., " Refractive
                Index
                Index"

should read --Refractive
                Index--.

Column 21,
Lines 64-65, "with refractive indices $n_1^1$ and $n^{31}$" should read
--with refractive indices $n_1^1$ and $n_3^1$ --.

Column 22,
Line 14 "of benzophenome" should read --of benzophenone--.

Column 22,
Lines 65-65 "heated enclosed comprises" should read --heated enclosure comprises--.

Signed and Sealed this

Twenty-ninth Day of May, 2007

JON W. DUDAS
*Director of the United States Patent and Trademark Office*